US012303913B2

(12) United States Patent
Schmitz

(10) Patent No.: US 12,303,913 B2
(45) Date of Patent: May 20, 2025

(54) ELECTROSTATIC SEPARATOR

(71) Applicant: Oliver Schmitz, Mönchengladbach (DE)

(72) Inventor: Oliver Schmitz, Mönchengladbach (DE)

( * ) Notice: Subject to any disclaimer, the term of this patent is extended or adjusted under 35 U.S.C. 154(b) by 394 days.

(21) Appl. No.: 17/912,551

(22) PCT Filed: Mar. 18, 2021

(86) PCT No.: PCT/DE2021/100276
§ 371 (c)(1),
(2) Date: Sep. 19, 2022

(87) PCT Pub. No.: WO2021/185418
PCT Pub. Date: Sep. 23, 2021

(65) Prior Publication Data

US 2023/0140445 A1 May 4, 2023

(30) Foreign Application Priority Data

Mar. 18, 2020 (DE) ..................... 10 2020 107 419.0

(51) Int. Cl.
*B03C 3/47* (2006.01)
*B03C 3/08* (2006.01)
*B03C 3/12* (2006.01)

(52) U.S. Cl.
CPC .................. *B03C 3/47* (2013.01); *B03C 3/08* (2013.01); *B03C 3/12* (2013.01)

(58) Field of Classification Search
CPC .... B03C 3/47; B03C 3/41; B03C 3/08; B03C 3/12; B03C 3/368; B03C 2201/10
See application file for complete search history.

(56) References Cited

U.S. PATENT DOCUMENTS 2,662,608 A * 12/1953 Fields ....................... B03C 3/12 96/76
4,119,416 A * 10/1978 Hayashi .................... B03C 3/40 96/75

(Continued)

FOREIGN PATENT DOCUMENTS

DE 202015000607 U1 4/2015
DE 102018205332 A1 * 10/2019 ............... B03C 3/06

(Continued)

OTHER PUBLICATIONS

EPO Machine translation of Abstract of DE202015000607U1, Apr. 27, 2015.

(Continued)

*Primary Examiner* — Jennifer Dieterle
*Assistant Examiner* — Sonji Turner
(74) *Attorney, Agent, or Firm* — CAHN & SAMUELS, LLP

(57) ABSTRACT

An electrostatic separator or precipitator through which an air stream to be cleaned of particles flows in a longitudinal direction includes at least one electrospray ionization source, which is supplied with a positive potential and can be implemented, for example, by the tips of a graphite fiber bundle, and a collector unit arranged downstream for particle separation and having parallel collector and driver plates. The ion flow from the corona zone is additionally homogenized and spread by an upstream collector element, in particular a collector grid, upstream of the at least one electrospray ionization source, so that high particle separation rates can be achieved with minimal ozone emissions. Alternatively, or in addition, the ion flow from the corona zone can be homogenized downstream of the at least one spray ionization source by one or more border counter-electrodes.

15 Claims, 2 Drawing Sheets

(56) References Cited

U.S. PATENT DOCUMENTS

| | | | | |
|---|---|---|---|---|
| 10,384,517 | B2 * | 8/2019 | Jee | B01D 53/32 |
| 10,767,877 | B2 | 9/2020 | Schmitz | |
| 2008/0034973 | A1 * | 2/2008 | Griffiths | B03C 3/36<br>96/57 |
| 2008/0296485 | A1 * | 12/2008 | Benter | H01J 49/162<br>250/288 |
| 2010/0037776 | A1 | 2/2010 | Chan | |
| 2010/0051709 | A1 * | 3/2010 | Krichtafovitch | B03C 3/368<br>236/36 |
| 2011/0171094 | A1 | 7/2011 | Zahedi | |
| 2019/0024913 | A1 * | 1/2019 | Schmitz | B03C 3/08 |

FOREIGN PATENT DOCUMENTS

| | | | |
|---|---|---|---|
| EP | 3552710 | A1 | 10/2019 |
| JP | H09248489 | A | 9/1997 |
| WO | 2017121429 | A1 | 7/2017 |

OTHER PUBLICATIONS

EPO Machine translation of Abstract of EP3552710A1, Oct. 16, 2019.

English Abstract of JPH09248489A1, Sep. 22, 1997.

English Abstract of WO2017121429A1, Jul. 20, 2017.

* cited by examiner

ELECTROSTATIC SEPARATOR

This U.S. patent application is a national stage application of PCT/DE2021/100276 filed on 18 Mar. 2021 and claims priority of German patent document 10 2020 107 419.0 filed on 18 Mar. 2020, the entireties of which are incorporated herein by reference.

BACKGROUND AND SUMMARY OF INVENTION

The present invention relates to electrostatic separators or electrostatic precipitators and to a room ventilation unit having such electrostatic separators or precipitators.

WO 2017/121 429 A1 describes the use of electrostratic separators in controlled decentralised living room ventilation systems with heat recovery.

The subject matter of the present invention are electrostatic separators or precipitators which are optimized with regard to efficiency, construction size, power consumption and ozone emissions and which can be used as mobile stand-alone devices or as a component of air-conditioning and ventilation systems, for example of decentralized or central room ventilation systems. Many industrial applications in the field of air purification and in principle also in the field of cleaning other gases, for example in the area of smoke gas purifications, or also in the automotive sector (e.g. HVAC systems for vehicle interiors) are also imaginable.

In recent years, it has been recognized which serious effects air particles having an aerodynamic diameter of 10 μm or less—the so-called fine dust—or aerosols can have on the human body. Since conventional filters, such as, for example, filter mats, are not very powerful with regard to their filter performance, in particular in the case of smaller particles, such as fine dusts or aerosols, in particular if greater pressure losses are to be avoided, electrostatic precipitators or separators or electrostatic filters (also known as arrangements for electronic dust separation) operated with high voltages of a few kilovolts have been proposed for use in decentralized residential ventilation systems in the context of the above-mentioned publication. Hereby the particles present in the air are separated by virtue of electrical charges.

In particular, two-stage electrostatic precipitator working according to the so-called Penney principle are used for room air purification.

In this case, the particles to be deposited are first electrically charged by means of a so-called ionizer. This is done by so-called corona discharges, in the prior art mostly by means of a corona wire positively charged with a high voltage of a few kV or by means of a plurality of correspondingly positively charged corona wires which are arranged at a distance from negatively charged electrodes, so that in the immediate vicinity of the wire or the wires, when a sufficiently high voltage is applied, a high field strength and accordingly a corona discharge is evoked by local field ionization.

This corona discharge initially produces positively ionized gas molecules around the ionizer in a spatially narrowly limited zone (so-called corona zone), which gas molecules move to the negative electrodes and thereby accumulate on their further path outside the corona zone to the (fine dust) particles or aerosols to be deposited and also charge them.

The second stage of such electrostatic precipitator represents a so-called collector unit arranged downstream of the ionization unit in the direction of flow, which normally consists of a sequence of alternately charged plates, through which the air to be purified flows with the particles previously charged by the ionization unit. As a result of the coulomb forces, the positively charged particles drift to the non-positively charged plates, the so-called collector plates, adhere there and can be removed by periodic cleaning or tapping. The opposite plates of the collector unit, which are charged with the collector plates (positive), are referred to as driver plates; they provide the electric field for the electrostatic separation together with the respective opposing collector plates.

A disadvantage of electrostatic filters is the ozone formation caused by high-voltage-induced gas ionization processes, which can lead to anything from minor health impairments like slight eye irritation up to more serious health problems, such as headaches or respiratory problems, or to overshoots of the permissible MAK values (MAK=maximum workplace concentrations) for ozone, in particular when this type of electrostatic precipitator is used in interiors.

For the impact ionization processes, also a certain amount of electrical energy is required, so that, in view of the fact that electrostatic filters are frequently used in continuous operation and the corresponding high-voltage power supply components are subject to electric losses, a high efficiency of ion generation should be ensured with regard to an energy-saving operation.

The object of the present invention is to further optimize the above-described electrostatic separator or precipitator with regard to efficiency, compactness, energy utilization and ozone emissions and to provide an electrostatic separator or precipitator which is easy to clean and to service as well as easily scalable for different performance classes and air cross-sectional geometries and which has the above-mentioned properties.

The aforementioned object is achieved by means of an electrostatic separator or precipitator having the features of claim 1 and/or by means of a room ventilation unit having such an electric separator or precipitator according to claim 13.

Advantageous embodiments of the invention are explained in the dependent claims.

In the context of the invention, an electrostatic precipitator, through which a stream of air to be cleaned flows in a longitudinal direction, comprises at least one spray or electrospray ionization source, which is arranged within the air flow and is applied by a positive electrical ionization potential, respectively, which further comprises a collector unit arranged downstream of the at least one spray ionization source for particle deposition, having a plurality of substantially parallel arranged electrically conductive collector and driver plates through which the air flow flows, which are alternately charged with electrically negative collector or opposite positive driver potentials.

According to the invention, such an electrostatic separator or precipitator is characterized by an upstream-electrode element which is arranged in the flow path upstream of the at least one spray ionization source and is applied by an electrically negative potential.

This can in particular be an upstream (metal) grid or mesh which is arranged upstream of the spray ionization source and through which the particle-laden air flows. Alternatively, a metal ring surrounding the flow path or a number of metal lamellae or wires arranged substantially in the flow path or wires (for example as wire harp), where all these elements are intended to be characterized in that they are each acted upon by a collector potential (i.e., with a potential which is significantly more negative than the positive ionization potential, which can be mass potential), in the air flow path or at its immediate border, and which is located—as mentioned—upstream of the ionizers.

As a result of experiments (based on an electrostatic separator geometry as described further with reference to the exemplary embodiment, i.e. with approximately point-shaped spray ionization sources and so-called border counter-electrodes), it has been shown that such an upstream collector element (in the test implemented as a closely meshed grid) has improved particle separation efficiency typically by up to ca 50%, as a result of which a predetermined deposition power can be achieved with fewer spray ionizers, as a result of which production process efforts for the electrostatic precipitator, power consumption, but—above all—also absolute ozone emissions can be significantly reduced.

The fact that an element, which is arranged upstream of the ionizers, so that the air to be purified strikes the latter before it reaches the spray ionizers, can have such a significant effect on the deposition performance, appears at first somewhat surprising.

However, it must be considered that typical ion velocities are generally orders of magnitude higher than typical air flow rates in such electrostatic separators, so that the gas ions can also readily move "against the stream" when electric fields are set accordingly. The gas volume upstream of the spray ionization sources for particle ionization is thus additionally made usable by the upstream collector element.

In the case of approximately point-shaped spray ionization sources, which are preferred in the context of the present invention, in this way, the complete "hemisphere" upstream of spray ionization sources is additionally made usable for particle ionization; which results in a significant increase in deposition performance.

Basically, this principle can also be used for other spray ionization sources, e.g. "classical" corona wires, however.

Such an upstream collector element can further have an additional benefit, since it can also serve as protection of downstream electrical or electronic components from undesired electrostatic charging by the ion currents.

In a preferred embodiment, the upstream collector element can be designed as a collector grid or mesh.

Such a collector grid preferably has a mesh number which is greater than or equal to the number of spray ionization sources. Thus, if four spray ionization sources are present, at least four meshes can preferably also be provided, or more meshes, if necessary.

The mesh width of a collector grid can be in the range between approximately 2.5 mm and 25 mm in typical electrostatic depositors.

Further preferred embodiments of the upstream collector element have certain resemblances to the embodiments of the remaining elements, i.e. in particular with regard to the design of the spray ionization sources and the so-called border counter-electrodes. Therefore, preferred embodiments of the remaining elements will first be discussed in the following, before reference is then made again specifically to the upstream collector elements:

The at least one spray ionization source should be formed approximately in a point-shaped or punctiform manner; in particular, the at least one spray ionization source can be formed by a metallically conductive fine needle tip or by the free fiber end of a conductive fiber or by a plurality of adjacent free fiber ends of a bundle of conductive fibers, wherein the conductive fibers are preferably graphite filaments and/or wherein the needle tip or the free fiber ends are preferably arranged facing in the direction of flow.

In this way, a small volume, which tends to be spherical or dome-shaped, is produced (typically a few mm in diameter), and since the ozonation takes place practically only in this zone, the absolutely generated ozone quantity is reduced.

However, it has proven to be important in such approximately point-shaped spray ionization sources to split up or fan out the gas ions as homogeneously as possible into a gas volume which is as large as possible with the particles to be deposited, in order to create optimum effective cross-sections for the ionization of the particles there.

In a preferred embodiment, at least one border counter-electrode can be provided in the electrostatic precipitator,

- each of which is assigned to one of the one or more of the spray ionization sources,
- which is arranged in the longitudinal direction between the associated spray ionization source and the collector unit and at a longitudinal distance from the associated spray ionization source,
- which has electrically conductive walls which extend substantially in the longitudinal direction of flow and which delimit a flow channel assigned to the respective spray ionization source on all circumferential sides or at least in circumferential partial sections,
- wherein the electrically conductive walls of the associated border counter-electrode are applied with a negative border counter-electrode potential opposing the ionization potential, and
- wherein the spray ionization source is arranged centrally in a transverse plane with respect to the contour of the respective associated border counter-electrode.

The term "border counter-electrode" is intended to express that the conductive walls of the border counter-electrode lie on a generally negative potential opposite to the spray ionisator, similar to the collector plate potential of the collector unit (or similar to the upstream collector element), wherein these potentials need not be identical.

These border counter-electrodes are intended to ensure the most efficient utilization of the ion fields generated by the corona discharges downstream of the spray ionization sources.

Thus, the border counter-electrodes represent in a certain way a counterpart to the upstream collector element proposed according to the invention. However, they can also advantageously be implemented without the upstream collector element.

Preferably, the at least one border counter-electrode can each have a curved contour which can be rectangular, in particular square, polygonal, round, elliptical, honeycomb or otherwise. If a rectangular or polygonal contour of the edge contour is selected, the walls are preferably formed at least on two opposite sides.

In the case of a round contour of the border counter-electrode, the distances between the spray ionization source and the facing edges of the collector are each constant per se. If a plurality of spray ionization sources arranged in a matrix-like manner are provided, such a round contour of the border counter-electrodes is not optimal, however, because, in the case of a surface having a plurality of adjacent circles, the transversely available surface is not optimally utilized (similar to a perforated plate), wherein many flow channels have a rectangular basic shape, so that a rectangular or square grid would normally represent the optimum arrangement for a plurality of border counter-electrodes, wherein a "lattice bar" would then simultaneously act as an electrode for two border counter-electrodes located on the side.

In the case of such a rectangular contour, however, the distance between the spray ionization source and the facing edges of the respective border counter-electrode is no longer automatically constant, so that ion density becomes more or less inhomogeneous. In a preferred embodiment, it can therefore be provided that face edges of the border counter-electrodes, which face edges facing in the direction of the respective spray ionization source, have a recess which is curved in an arc-shaped manner respectively completely or in partial sections in such a way that an imaginary surface running through all or through at least two opposite facing edges of the border counter-electrode facing the spray ionization source has a generally concave or specially spherical surface with respect to the associated spray ionization source.

Referring again to the upstream collector element standing in the focus of the present invention, it is preferably distanced from the at least one spray ionization source in the upstream direction by a distance which corresponds to 50% to 300%, preferably 75% to 150% of the longitudinal distance between the at least one spray ionization source and the associated border counter-electrode, in order to achieve an ion density as uniform as possible in both directions.

If no border counter-electrodes are to be provided, then the preferred distance of the upstream collector element from the spray ionization source can preferably be carried out at the distance of the spray ionization source collector unit.

In a further preferred embodiment, the upstream collector element has one or more cup-shaped curvatures or protuberances which are concave with respect to the at least one spray ionization source and which are intended to ensure a distance as constant a as possible from all points of the collector element to the at least one spray ionization source.

Preferably, it can be provided that the electrodes of the upstream collector element are at least partially aligned in a longitudinal projection direction with be preferably all or at least a part of the border counter-electrodes. Border counter-electrodes and upstream collector element thus correspond, in a preferred embodiment, entirely or partially geo-metrically in such a way that the elements are arranged in a line.

The present invention enables a very simple and effective scaling of the electrostatic filter for virtually any desired air passage area, in that a plurality of spray ionization sources are arranged in a matrix-like manner approximately in the centers of the rectangular meshes of an imaginary grid which is composed of a grid row and a plurality of grid columns or of a plurality of grid rows and a grid column or of a plurality of grid rows and a plurality of grid columns, wherein all the row heights and all column widths are no more than ±50%, preferably no more than ±25%, of a uniform basic dimension or size.

That is to say, virtually any number of spray ionization sources can be arranged in a matrix-like manner in rows and columns, and thus overall an air flow can be optimally cleaned by means of a rectangular cross-section of any desired size, where even non-rectangular cross-sections (e.g. round cross-sections) can be approximated by a usable number of columns per row (or vice versa). Each cell is preferably based on a specific basic measure (e.g. 5 mm to 25 mm), which is optimized with regard to the electrostatic filter effect, and the individual cell dimensions then deviate only to a limited extent from this basic dimension.

In one embodiment, the electrostatic precipitator preferably also has a fan unit for forced air flow conveying through the electrostatic precipitator, which is arranged in the flow path upstream of the collector element and is protected from electrostatic charging by the fan element.

For this purpose, various solutions, including efficiency and noise emission aspects, are known in the prior art, such as radial or axial fans or the use of a plurality of fans arranged in series.

Of course, an electrostatic precipitator furthermore preferably also has further necessary or optional components, such as a housing which defines the main air channel, with corresponding inlets and outlets. In addition to the actual electrostatic precipitator, it is also possible to provide further filters, for example activated carbon filters, sound insula-tion elements, etc., as it is well known in the art.

Finally, within the scope of the invention, a room ventilation unit is proposed which has an electrostatic precipitator as described above.

With the electrostatic precipitator according to the invention, very good deposition rates, of, for example, >90% (PM 2.5 or less, PM=particulate matter) can be achieved in a compact construction with a test device corresponding to the exemplary embodiment described further below with four spray ionization sources and with border counter-electrodes and upstream collector grids, wherein the ozone concentration measured at the device was below a limit value of 10 ppb and predominantly also a limit value of 5 ppb has not been exceeded. In this way, measured ozone emissions range in the concentration range of natural background concentrations for ozone for internal/indoor spaces.

The invention is explained in more detail below with reference to the exemplary but nor limiting embodiments illustrated in the figures.

DETAILED DESCRIPTION OF THE DRAWINGS

Figure 1:
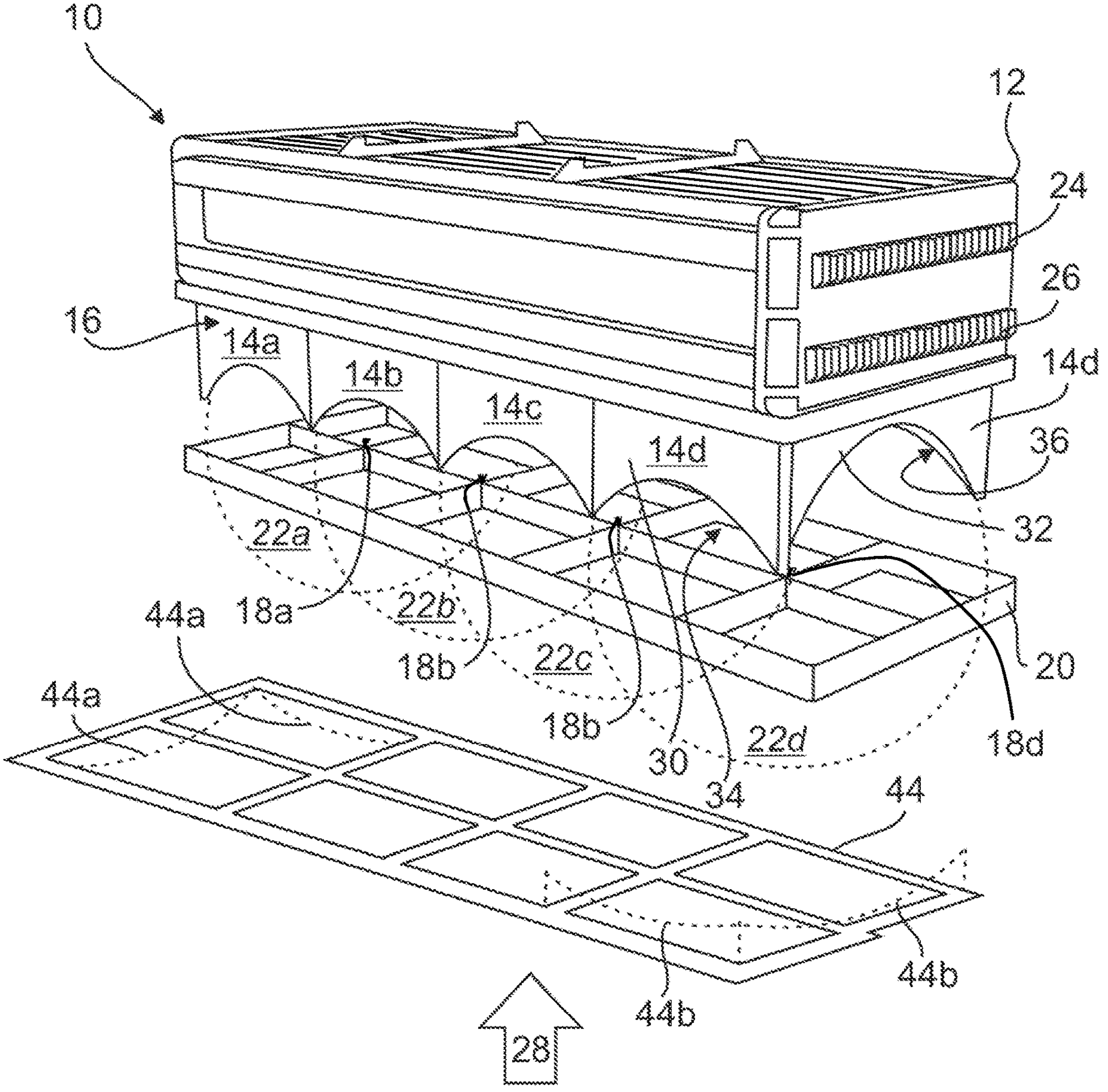
FIG. 1 shows a perspective oblique view of an electrostatic separator according to the invention with four spray ionization sources and corresponding border counter-electrode/collector units and an upstream-collector grid.
Figure 2:
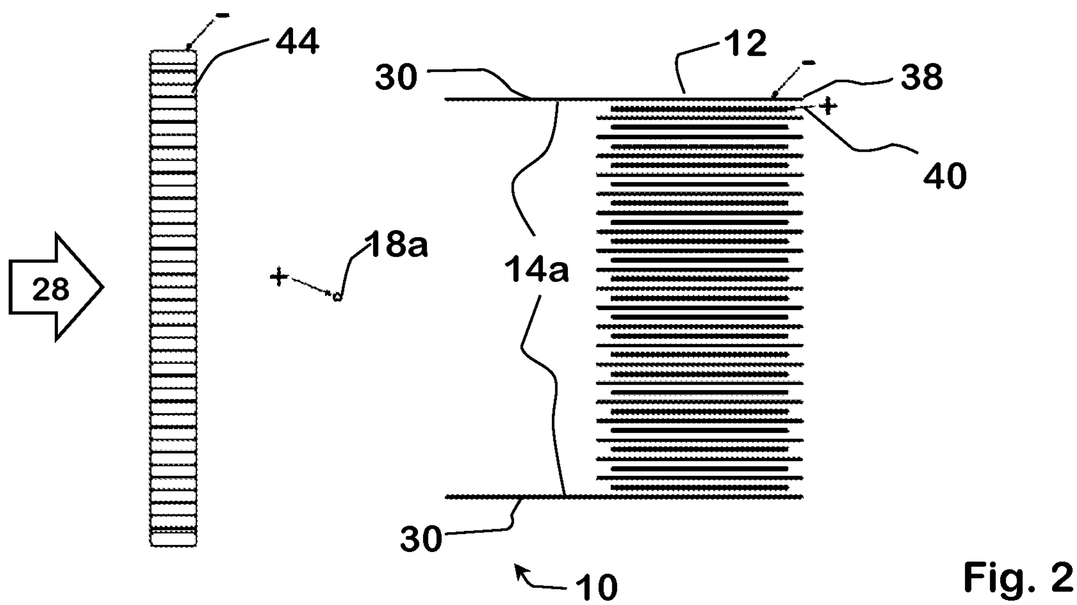
FIG. 2 shows a further embodiment of the invention with upstream collector electrodes.

According to the illustration in FIG. 1, an electrostatic precipitator 10 according to the invention has as essential components a collector unit 12 which, in principle, consists of a number of collector plates 38 arranged in parallel to driving plates 40 (whereas, in the exemplary embodiment, collector plates are somewhat shorter than driver plates) (see FIG. 2).

This collector unit 12 is flowed through in a main flow direction (arrow 28) by an air flow to be cleaned of particles, this air flow generally being ensured by one or more fans (not shown in FIG. 1), for which purpose the electrostatic precipitator 10 is located within an air flow channel (also not shown in FIG. 1).

The collector unit 12 with its collector plates 38 at a negative potential electrostatically attracts particles (e.g., fine dust, pollutant particles, aerosols, etc.) from the air stream, which have been previously positively ionized, as a result of which the particles adhere to the collector plates 38 and thus can be removed from the air stream. The adhering particles can be removed, for example, by regular cleaning, mechanical knock-off or periodic air impact. Germs, bacteria or viruses adhering to deposited aerosol particles can also be deactivated—if they do not dry out anyway—by additional measures, such as UV light.

The collector plates 38 are connected to a negative voltage source—which can also be the ground potential—via a contact strip 26 and via corresponding counter-contact elements provided in a flow channel wall (voltage source and counter-contact elements are not shown).

Analogously, the driver plates 40 are connected to a positive potential of a corresponding voltage source via a contact strip 24 located above the contact strip 26. This is in general an average positive potential which lies between the negative potential of the collector plates 38 and the (high) positive potential of the spray ionization sources 18*a-d* (explained further below). The spray ionization potential would typically be too high for the driver plates 40, i.e., flashovers could occur between the plates 38, 40.

The positively ionized particles are produced according to the so-called Penney principle by positive corona discharges, for which one or more, in the exemplary, not limiting embodiment, four, approximately point-shaped spray ionization sources 18*a-d* are provided according to the invention.

In the exemplary, not limiting embodiment shown, it is a bundle or shell of thin, electrically conductive graphite fibers, which are acted upon by a high-resistance high-voltage source (not shown) with a positive high voltage of some kV. Alternatively, individual conductive fibers or needle-like metal tips or the like can also be used as spray ionization sources.

The spray ionization sources 18*a-d* (the totality of the spray ionization sources are also designated by the reference numeral 16) are mounted on a non-conductive support grid 20 in which high-voltage lines (not shown) for connecting the ionization sources 18*a-d* to one or more high-voltage sources are guided. The ionization current established by the corona discharge can be electronically controlled in one embodiment.

Within the scope of the invention it is advantageous if the ions are emitted as far as possible from one point, respectively, whereby it is understood that the term "point-shaped" is of course an idealized specification. At the thin tips of the spray ionization sources 18*a-d*—in cooperation with counter-electrodes as described further below—high electric field strengths are generated, which generate ions in a spatially narrowly limited are of the ionization sources 18*a-d*, typically of a few mm, of the so-called corona zone; whereby the boundary layer is also known as a so-called corona skin, ionizing gas molecules from the air flowing through. These ionized gas molecules then collide with the particles to be deposited, provided, that they have sufficient opportunity to interact with them, and ionize them, so that they can be correspondingly electrostatically deposited in the collector unit 12.

This secondary ionization of the particles to be deposited by the gas ions is carried out in a substantially larger volume than the corona discharge itself.

Within the scope of the present invention, it has been recognized that it is important for optimum deposition performance with minimal ozone emissions to initially generate the gas ions in a volume that is as small as possible (because ozone is only present there due to high ozone generating field strengths) and then distributed as uniformly and homogeneously as possible through the gas volume flow in order to achieve optimum flow cross-sections between gas ions and particles, wherein a focus of the present invention lies at the upstream air volume.

For this purpose, on the one hand, to one (preferably each) spray ionization source a border counter-electrode 14*a-d* is assigned, which has walls 30, 32 located at a negative potential with respect to the spray ionization source 18*a-d*, which walls 30, 32, for the respective spray ionization source 18*a-d*, delimit an (section-by-section) flow channel and which are spaced apart from this spray ionization source.

When the border counter-electrodes 14*a-d* are rectangular shaped as shown in FIG. 1, the opposite walls of the wider side are denoted by 30 and the ones of the narrower side are denoted by 32.

Due to the in totality overall rectangular grid-like structure of the border counter-electrodes 16, the narrow side walls 32 of the individual border counter-electrodes 18*a-d* are each formed by a common narrow side wall 32 for adjoining border counter-electrodes (i.e., except for the outermost narrow sides).

The positive gas ions are drawn through these border counter-electrodes 14*a-d* and are ideally fanned out over the entire flow channel available, so that optimum effective cross-sections between gas ions and particles are achieved.

Furthermore, it has been recognized that the homogenization of the gas ion current is then almost optimal if the distances between the spray ionization source 18*a-d* and the associated border counter-electrode 14*a-d* are as constant as possible. Therefore, the spray ionization sources 18*a-d* are arranged approximately centrally or centered with respect to the contour of the border counter-electrodes 14*a-d* or with respect to the flow channels defined by these definite flow channels. "Approximately" is intended to be within the scope of the invention that design-related deviations of typically a few percent to about 10% or 20% are tolerable.

In case of a rectangular grid, as it is appropriate for an aerodynamically ideal covering of the overall flow cross-section (in particular of a rectangular flow cross-section) when a plurality of spray ionization sources 18*a-d* are provided, the distances between the idealized point-shaped or punctiform spraying source 18*a-d* and the facing edges of the walls 30 that are relevant to the electric field of the border counter-electrodes 14*a-d* vary in a relatively strong way in the case of an assumed "straight" design of these facing edges, despite the central arrangement of the spray ionization sources 18*a-d*. That is to say, in case of a "straight" design of the facing edges, the distance to the respective center of the front edges would be different than to the corners.

Therefore, in the embodiment according to FIG. 1, it is provided that the walls 30, 32 of the border counter-electrodes have rounded incisions 34, 36, which are defined by the intersection curves of a virtual sphere (or a spherical segment, if only one side is considered) 22*a-d* with the respective spray ionization source 18*a-d* in the imaginary center point. As a result of this, a uniform spacing of the spray ionization sources 18*a-d* to the border counter-electrodes 14*a-d* is realized and thus, an ion distribution which is as uniform or homogeneous as possible is achieved, wherein in practice some field distortions are unavoidable, for example by the superposition of the electric fields emanating from the collector electrode and driver plates.

In a more general embodiment, the contour of the incisions 34, 36 can be formed in the border counter-electrode walls 30, 32 such that the virtual surface is concave at least from the perspective of the spray ionization source.

In the context of the present invention, as an alternative or in addition to the above-described measures taken downstream of the spray ionization sources, a further upstream collector element 44 is seen upstream, which in FIG. 1 is represented only schematically as a grid 44 with eight meshes, but which can also have other shapes.

The aforementioned upstream collector element or grid 44 is also placed to or applied by a negative potential, e.g., the ground potential, and thus provides for a fanning and homogenization of the gas ion currents upstream of the spray ionization sources 18*a-d*

The longitudinal distance of the upstream collector element 44 from the spray ionization sources 18*a-d* is preferably selected to be approximately as long as the distance of the border counter-electrodes 18*a-d* from the spray ionization sources 18*a-d* in order to achieve a uniform current distribution in both directions. The ideal distance is not necessarily the same in both directions, since the field properties of the border counter-electrodes and of the upstream collector element 44 are generally different. If necessary, the ideal distance may be determined experimentally. The spacing of the mesh or grid 44 shown in FIG. 1 can therefore be varied; in particular, it is conceivable to arrange the grid 44 approximately equidistant to the border counter-electrodes 14*a-d*, i.e. as far as the upstream part of the imaginary spherical surfaces 22*a-d*.

In principle, other types of upstream collector elements, such as, for example, an only edge-side ring or a wire harness, are also conceivable.

Furthermore, in accordance with the preferred embodiment of the border counter-electrodes, a non-planar configuration of the upstream collector element, e.g. with cup-like bulges, is also conceivable in order to keep the distance between the collector element and the spray ionization source as constant as possible.

In FIG. 1, two variants of the upstream collector element are indicated by dashed lines (and only in partial regions), namely on the one hand a first curved variant 44*a*, in which the wire-like electrodes of the collector element are curved approximately corresponding to the border counter-electrodes and thus a more uniform distance from the spray ionization source is ensured (in this embodiment, the elongated central strut of the collector element is then preferably waived). Alternatively, in a second variant 44*b* the upstream collector element can be designed in a manner similar to the border counter-electrodes, namely as a metallic strip with a certain longitudinal extent, in each of which an arc-shaped cut-out is embedded.

FIG. 2 shows an embodiment of an electrostatic precipitator 10 which can be realized in a technically particularly simple manner, in which a border counter-electrode 30 is formed by means of two opposite walls from an extension of the outermost collector plates 38 of the collector unit 12, wherein these walls 30 can be formed either straight or with the above-described round incisions (not shown). In this further embodiment, a collector grid 44 as an upstream collector element is also provided upstream of the spray ionization source 18*a*.

Figure 3:
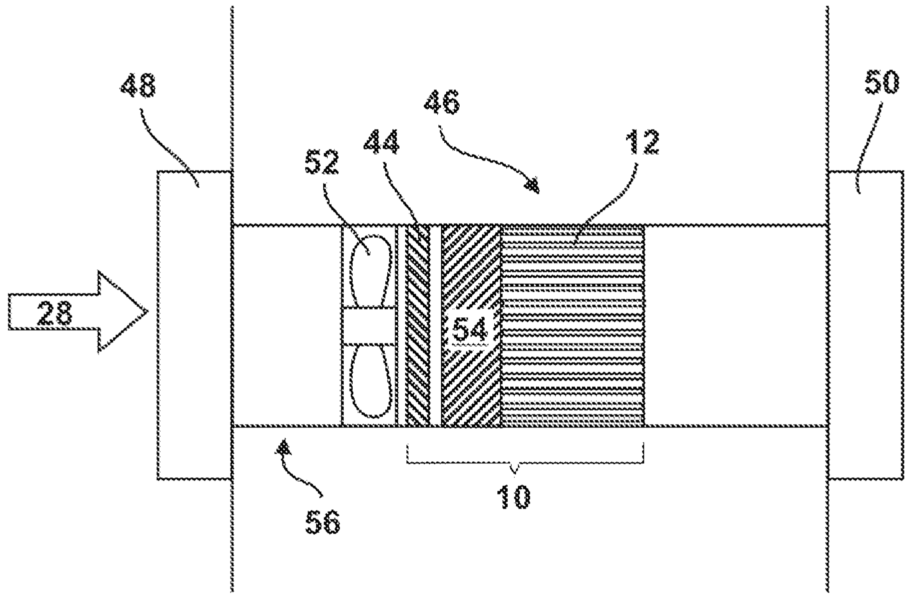
FIG. 3 shows a schematic illustration of a decentralized room ventilation unit with an integrated electrostatic precipitator according to the invention.

FIG. 3 schematically illustrates how an electrostatic precipitator 10 according to the invention could be integrated into a decentralized room ventilation unit 46, whereby—as initially mentioned—alternative uses, e.g. for "stand-alone" air cleaners for residential spaces or for a wide variety of further applications in a similar configuration, are of course also possible and intended.

In this case, an ionization/counter-electrode unit is shown schematically as a "black box" 54 adjacent to the collector unit 12, an upstream collector grid 44 according to the invention being provided upstream and again upstream of which an axial fan 52 is arranged.

The elements mentioned are arranged sequentially in a tube in a wall outlet 56, which extends between a room-side air inlet/air outlet 48 and an outside air inlet air outlet 50.

In this configuration, the upstream collector grid 44 additionally also protects the electronics of the fan 52, or the control thereof, from excess voltage damage by eventual discharges of ion-current-induced electrostatic charges.

Figure 4A:
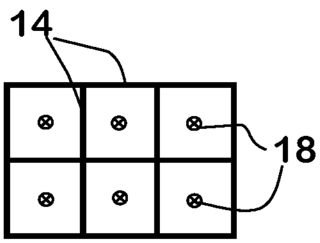
FIGS. 4*a-c* show examples of different border counter-electrode configurations.
Figure 4B:
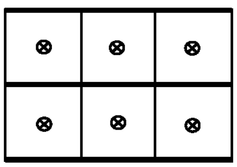
Figure 4C:
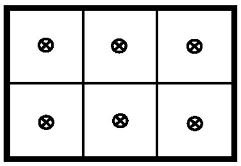

In FIGS. 4*a-c*, various variants of border counter-electrode configuration on the example of an electrostatic filter having, for example, a total of six spray ionization sources 18 in a 2×3 (or depending on the designation 3×2) matrix are shown schematically (in contrast, the example of FIG. 1 has a 1×4 or 4×1 configuration). The respectively thicker lines are intended to indicate guide plates with border counter-electrodes 14, which have thinner lines.

In FIG. 4*a*, all cell boundaries are provided with border counter-electrodes, whereas in FIG. 4*b* this is the case only in the case of the longitudinal side electrodes, and in the case of FIG. 4*c* only in the case of the outer boundaries.

It can also be seen from the schematic representation of FIGS. 4*a-c* that the electrostatic filter 10 can be scaled or matched very easily to different cross-sectional areas, since this is assembled modularly from individual cells, wherein the individual cell is optimized in each case with respect to the electrostatic deposition properties, and virtually any cross-sectional areas can be covered with these cells, without the performance of the individual cells having to be re-engineered.

LIST OF REFERENCE SIGNS

- 10 Electrostatic precipitator
- 12 Collector unit
- 14*a-d* Border counter-electrodes
- 16 Totality of border counter-electrodes (grid)
- 18*a-d* Spray ionization sources
- 20 Support grid
- 22*a-d* Imaginary spherical surfaces
- 24 Driver plate contact row
- 26 Collector plate contact row
- 28 Arrow indicating direction of flow
- 30 Longitudinal side walls border counter-electrodes
- 32 Narrow-side walls of border counter-electrodes
- 34 Cut-in border-counter-electrode walls (longitudinal side)
- 36 Cut-in border-counter-electrode walls (narrow side)
- 38 Collector plates
- 40 Driver plates
- 44 Upstream collector grid
- 44*a* First option for upstream collector grid
- 44*b* Second option for upstream collector grid
- 46 Decentralized room ventilation unit with electrostatic precipitator
- 48 Room-side air inlet/air outlet
- 50 Outer air inlet/air outlet
- 52 Axial fan
- 54 Ionization/border counter-electrode unit
- 56 Wall passage

The invention claimed is:

1. An electrostatic separator (10) through which a stream of particles in an air flow to be cleaned flows in a longitudinal direction, comprising:

a spray ionization source which is arranged within the air flow or multiple spray ionization sources (18*a-d*) which are arranged within the air flow in a matrix-like manner, which spray ionization source(s) is or are applied by a positive electric ionizer potential, a collector unit (12) arranged downstream of the at least one spray ionization source (18*a-d*) for particle deposition, having a plurality of electrically conductive collector and driver plates (38, 40), which are arranged substantially in parallel and through which the air flow flows and which are alternated respectively with an electrically negative collector potential or an opposite positive driver potential, and at least one border counter-electrode (14*a-d*), each of which is associated with one of the one or more spray ionization sources (18*a-d*), wherein the at least one spray ionization source (18*a-d*) is approximately point-shaped, and wherein the at least one border counter-electrode is arranged in a longitudinal direction between the associated spray ionization source (18*a-d*) and the collector unit (12) and at a longitudinal distance from the associated spray ionization source (18*a-d*), and has electrically conductive walls (30, 32) which extend substantially in a longitudinal flow direction and which delimit a flow channel upstream of the respective spray ionization source (18*a-d*) on all circumferential sides or at least in circumferential partial sections, wherein the electrically conductive walls (30, 32) of the at least one border counter-electrode (14*a-d*) are applied by a negative border counter-electrode potential directed opposite the ionizer potential, and wherein the spray ionization source (18*a-d*) is centrally arranged with respect to a contour of the respectively associated border counter-electrode (14*a-d*) in a transverse plane.

2. Electrostatic separator (10) according to claim 1, wherein the at least one spray ionization source (18*a-d*) is formed by a metallically conductive fine needle tip or by a free fiber end of conductive fibers or by a plurality of adjacent free fiber ends of a bundle of conductive fibers, wherein the conductive fibers are graphite filaments and/or wherein the needle tip or the free fiber ends of the at least one spray ionization source (18*a-d*) are arranged facing in the flow direction (28).

3. Electrostatic separator (10) according to claim 1, wherein the face edges of the associated border counter-electrode (14*a-d*) facing the respective spray ionization source (18*a-d*) have a recess (34, 36) which is curved in an arc-shaped manner completely or in partial sections respectively, in such a way that an imaginary surface (22*a-d*) running through all or through at least two face edges of the border counter-electrode (14*a-d*) facing the spray ionization source (18*a-d*) with respect to the associated spray ionization source (18*a-d*) has a generally concave or specially a spherical-surface-shaped form.

4. Electrostatic separator (10) according to claim 1, wherein with respect to a clear span of a border counter-electrode (14*a-d*), wherein in the case of a rectangular-shaped border counter-electrode contour, including a square-shaped contour, the clear span d corresponds to the smaller of the side lengths, or in the case of an elliptical-including a circular-border counter-electrode contour, the clear span d corresponds to the smaller inner half diameter of the ellipse, and in any other shape the clear span d corresponds to the smallest inner diameter through the respective contour center of gravity, the height extension of the border counter-electrode (14*a-d*) is between 25% and 200% of the respective clear span d in the longitudinal direction-without considering optional arc-shaped incisions (34, 36);

and/or the longitudinal distance of the spray ionization source (18*a-d*) from the frontmost facing edge regions of the associated border counter-electrode (14*a-d*) in upstream direction is between 25% and 400% of the clear span d.

5. Electrostatic separator (10) according to claim 1, wherein the upstream collector element (44) from the at least one spray ionization source (18*a-d*) has a distance in an upstream direction corresponding to 50% to 300% of a longitudinal distance between the at least one spray ionization source (18*a-d*) and an associated border counter-electrode (14*a-d*).

6. Electrostatic separator according to claim 1, wherein the electrodes of the upstream collector element (44) are at least partially aligned in a longitudinal projection direction with all or at least a part of the border counter-electrodes (14).

7. Electrostatic separator (10) according to claim 1, wherein the upstream collector element (44*a, b*) has one or more constant curvatures or protuberances with respect to the at least one spray ionization source (18*a-d*), which are kept as constant as possible from all points of the upstream collector element (44) to the at least one spray ionization source (18*a-d*).

8. Electrostatic separator (10) according to claim 1, wherein a plurality of spray ionization sources (18) are arranged in a matrix-like manner approximately in centers of rectangular meshes of an imaginary grid which consists of a grid row and a plurality of grid columns or of a plurality of grid rows and a grid column or of a plurality of grid columns and a plurality of grid columns, wherein all the row heights and all column widths do not deviate by more than ±50% from a uniform basic size.

9. Electrostatic separator (10) according to claim 1, wherein a fan unit (52) for forced air flow conveying through the electrostatic separator (10) is provided, which is arranged in the flow path upstream of the upstream collector element (44) and is protected from electrostatic charging by the upstream collector element (44).

10. Room ventilation unit (46), comprising an electrostatic separator (10) according to claim 1.

11. Electrostatic separator (10) according to claim 1, further comprising an upstream collector element (44) applied by an electrically negative potential is arranged in the flow path upstream of the at least one spray ionization source (18*a-d*).

12. Electrostatic separator (10) according to claim 11, wherein the upstream collector element (44) is formed as a collector grid.

13. Electrostatic separator (10) according to claim 12, wherein the collector grid of the upstream collector element (44) has a mesh number greater than or equal to the number of spray ionization sources.

14. An electrostatic separator, comprising:

at least one spray ionization source having a positive potential and arranged within an air flow;

a collector unit arranged downstream of the at least one spray ionization source and having a plurality of electrically conductive collector plates connected to a negative voltage source and a plurality of electrically conductive driver plates connected to a positive voltage source, wherein the collector plates and the driver plates alternate and are substantially in parallel; and at least one border counter-electrode arranged in a longitudinal direction between the at least one spray ionization source and the collector unit, and having electrically-conductive walls that extend substantially in a longitudinal flow direction, wherein the at least one spray ionization source is centrally arranged with respect to a contour of the border counter-electrode in a transverse plane.

15. The electrostatic separator according to claim 14, further comprising an upstream collector element to which a negative potential is applied and which is arranged in a flow path upstream of the at least one spray ionization source.

* * * * *